United States Patent [19]

Perez

[11] 4,098,477
[45] Jul. 4, 1978

[54] ADJUSTABLE MOTOR MOUNT

[75] Inventor: Juan Perez, R.R. 3, 72nd St., South Haven, Mich. 49090

[73] Assignees: Thomas W. Litts, Pullman; Juan Perez, South Haven, both of Mich.; a part interest to each

[21] Appl. No.: 713,678

[22] Filed: Aug. 12, 1976

[51] Int. Cl.² .............................................. F16M 7/00
[52] U.S. Cl. .................................................... 248/23
[58] Field of Search ........................... 248/23, 22, 19; 74/242.13 R, 242.13 A, 242.12, 242.14 R

[56] References Cited

U.S. PATENT DOCUMENTS

| 355,723 | 1/1887 | Seelye | 74/242.14 R |
|---|---|---|---|
| 1,290,222 | 1/1919 | Johnson | 74/242.14 A |
| 1,463,406 | 7/1923 | Serrell et al. | 74/242.13 A |
| 1,526,045 | 2/1925 | Brown | 248/23 X |
| 2,125,004 | 7/1938 | Hamerstadt | 74/242.12 |
| 2,334,721 | 11/1943 | McMordie et al. | 74/242.14 R |
| 2,646,951 | 7/1953 | Sloyan | 248/23 |
| 2,784,607 | 3/1957 | Fulper | 248/23 X |
| 2,910,879 | 11/1959 | Hanks | 74/242.14 R |
| 3,017,226 | 1/1962 | Sloyan | 248/23 X |
| 3,044,312 | 7/1962 | Hall et al. | 74/242.12 X |

FOREIGN PATENT DOCUMENTS 641,190   4/1928   France .................... 74/242.13 A Primary Examiner—Francis K. Zugel
Attorney, Agent, or Firm—Price, Heneveld, Huizenga & Cooper

[57] ABSTRACT

The specification discloses an adjustable motor mount enabling rapid movement of a motor to allow easy removal and proper tensioning of a drive belt. The motor mount moves relative to a supporting framework by means of a cable coupled to a cable take-up means.

18 Claims, 5 Drawing Figures

ADJUSTABLE MOTOR MOUNT

BACKGROUND OF THE INVENTION

(1) Field of the Invention

The present invention relates to motor mounts; and, in particular, to a motor mount providing rapid removal and tensioning of a drive belt.

(2) Prior Art

The prior art teaches threaded screws coupled between a movable motor mount and a supporting framework to provide for movement of the motor mount relative to the supporting framework for such purposes as tensioning or removing a drive belt. While drive belts can be removed from motors in such a fashion, the time for moving the motor mount using a threaded screw is typically undesirably long.

While moving a motor mount relative to a supporting framework by such means as a connection of levers, thus omitting the threaded screw, is also known, the connection of the motor mount and the levers is in a predetermined relationship thereby limiting mounting positions of the motor on the motor mount and flexibility of use of the motor mount.

SUMMARY OF THE INVENTION

This invention provides for relatively quick movement of a motor mount, such as a motor mounting base relative to a supporting framework for the motor mounting base, by means of a cable coupled between the motor mounting base and the supporting framework. The cable transmits a force to the motor mounting base, and a connected motor, thereby acting to move the motor mounting base and tighten a power transmission drive belt associated with the motor. A cable take-up means mounted on the supporting framework and coupled to the cable, applies a force to the cable and causes movement of the cable to rapidly vary the length and tension of the cable thereby rapidly moving the motor mount and easily applying a desired amount of tension to the drive belt. Accordingly, the tension on the drive belt can be readily increased to facilitate installation of the drive belt and readily decreased to facilitate removal of the drive belt.

This invention recognizes that the use of a cable connecting the movable motor mounting base and cable take-up means is particularly advantageous when a motor mount is adjustable to permit numerous mounting positions for a motor. This invention also recognizes that it is particularly advantageous to combine the capability of rapid movement of a motor mount, for such purposes as adjusting or removing a drive belt, with a capability for mounting a motor in a plurality of positions. Therefore, the motor mounting base, the cable take-up means and the supporting framework are advantageously readily movable with respect to one another and interact to provide numerous mounting positions of a motor mounted on the motor mount. Another advantage of using such a combination including a cable is attaining movement and adjustability at a reduced cost.

DETAILED DESCRIPTION

Figure 1:
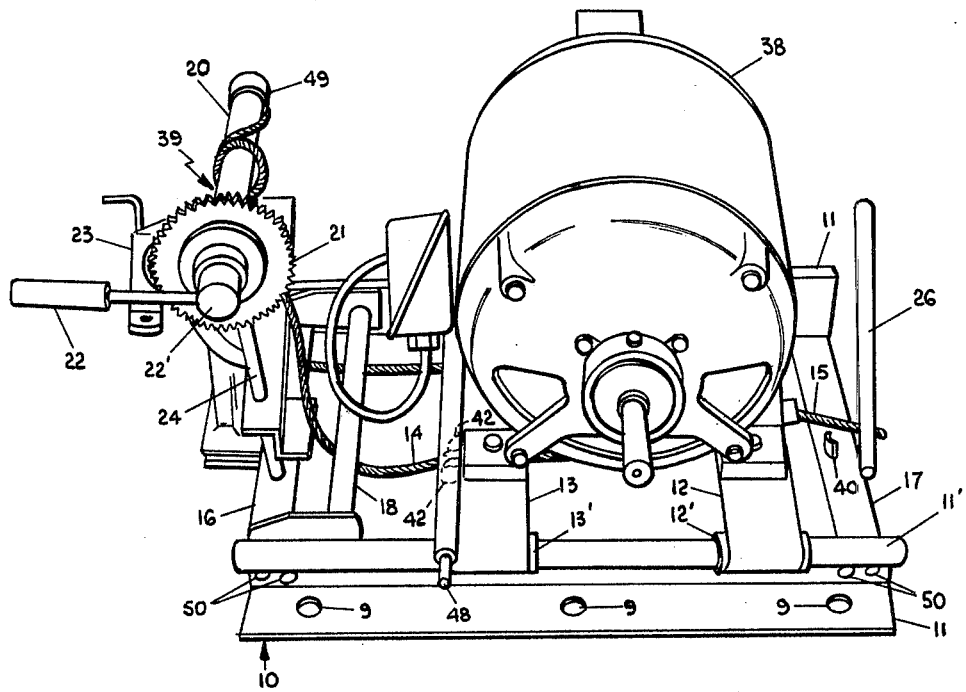
FIG. 1 is a side perspective view of a motor mount in accordance with an embodiment of this invention.

Referring to the drawings, a motor mount 10, typically fabricated of structural metals such as iron or steel, has a pair of parallel elongated angle iron side rails 11 having elongated rods 11' extending along and attached to their top edges. Slideably supported by rails 11 on rods 11' is a transverse front crossbar support 13 and a rear crossbar support 12. Supports 12 and 13 are elongated structural members of flat stock and extend at right angles to side rails 11. Curved semi-circular sleeves 12' and 13' extending from opposite ends of supports 12 and 13 respectively fit partially around rods 11' to provide a sliding supporting interface between supports 12 and 13 and the stationary side rails 11. Rails 11 are anchored in one embodiment to the floor using bolts extending through aperture 9. In FIG. 1, a motor 38 is mounted, typically with bolts and nuts, on crossbar supports 12 and 13 which can be adjustably spaced from one another along side rails 11 to accommodate the size of motor to be mounted.

A front side rail connector 16 extends perpendicularly between side rails 11 in proximity to one extremity of side rails 11, designated the "front" end, and supports a cable take-up means 39. Front side rail connector 16 is an elongated structural member and is rigidly secured, typically by bolts and nuts, to side rails 11 thereby supporting and spacing side rails 11. Similarly, a rear side rail connector 17 extends perpendicularly between side rails 11 in proximity to an extremity of side rails 11, designated the "rear" end, and is rigidly secured, typically by bolts and nuts and suitable brackets. The spacing of connectors 16 and 17 provides support at each extremity of side rails 11. Although connectors 16 and 17 are rigidly mounted, they can be mounted at a plurality of rotationally displaced positions with respect to side rails 11 which have apertures 50 for such rotationally displaced mounting.

Figure 2:
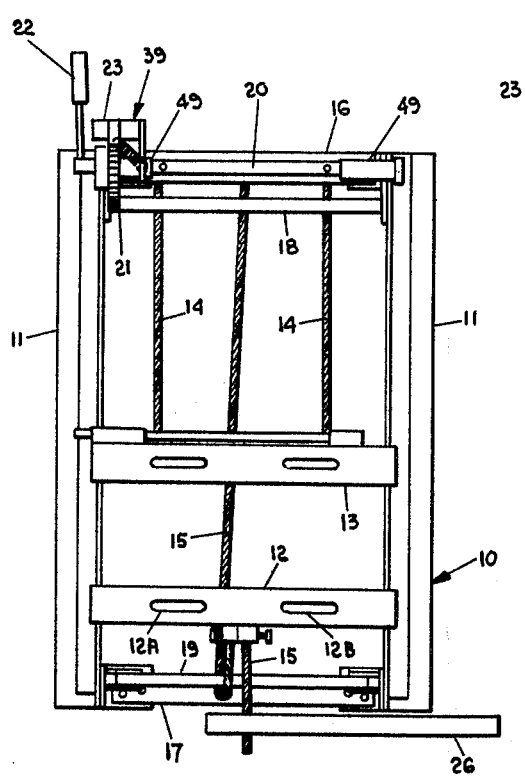
FIG. 2 is a top plan view of a motor mount sans motor and embodying the present invention.

A tensioning cable 14, which can be a single woven wire cable or two such cables as shown in FIGS. 1 and 2, is coupled between front crossbar support 13 and cable take-up means 30. The coupling means securing tensioning cable 14 to crossbar support 13 includes two pairs of lugs 42 extending downward from crossbar support 13 and compressing tensioning cable 14 between each pair of lugs 42 by the tightening of a screw 48 extending longitudinally along crossbar support 13. A front cable guide bar 18 is an elongated rod secured between side rails 11 and positioned adjacent front side rail connector 16 for providing a supporting guide to change the direction of tensioning cable 14 so the tensioning cable 14 is substantially parallel to either side rails 11 or cable take-up means 39. A release or return cable 15 is coupled to rear crossbar support 12 for moving supports 12 and 13 in a direction opposite to the direction of movement caused by tensioning cable 14.

Thus, motor mount 10 includes elements which form a support base, a slide mounted to the support base for securing a motor, and an adjustment means coupled between the support base and the slide. The adjustment means includes a cable take-up means and a cable coupled between the slide and the cable take-up means so the cable is wound on the cable take-up means to move the slide thereby changing the position of a motor mounted on the slide.

In FIGS. 1 and 2 a return lever 26 attached to release cable 15 for applying a force to release cable 15 and, in turn, to rear crossbar support 12 for moving motor 38 so a power transmission drive belt (not shown) coupled to motor 38 can be removed. When an operator applies a force to return lever 26, a fulcrum 40, shown in FIG. 1 as a concavely curved protrusion extending from back side rail connector 17, acts as a support point. FIG. 2 shows an embodiment of this invention having the release cable 15 also coupled to cable take-up means 39. A back cable guide bar 19 is securely connected between the back ends of side rails 11 and changes the direction of release cable 15 so a tension force applied by cable take-up means 39 to cable 15 moves crossbar supports 12 and 13 away from cable take-up means 39. Accordingly, force can be applied to release cable 15 in an analogous manner to the way force is applied to tensioning cable 14.

Figure 3:
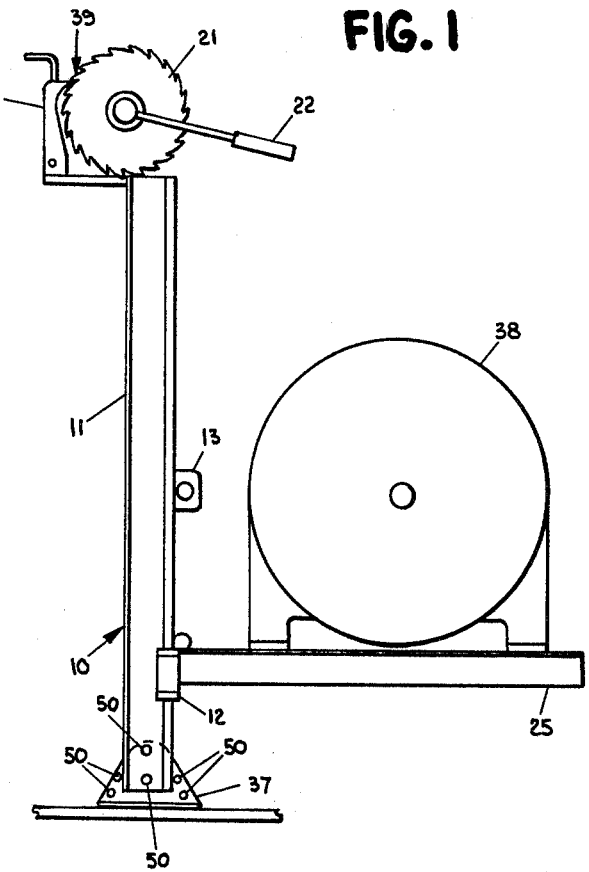
FIG. 3 is a side elevation view of a motor mount in accordance with an embodiment of this invention.

In accordance with the embodiment of this invention shown in FIGS. 1–3, cable take-up means 39 includes a rotatable cable take-up bar 20 about which is rolled or wrapped for tensioning cable 14 thereby applying force to tension cable 14 and the front of support bars 12 and 13 toward the left as seen in FIG. 1. Typically, cable take-up bar 20 has a radial opening extending through it for receiving tensioning cable 14 which is secured by a set screw extending into cable take-up bar 20 at a right angle to the radial opening. Cable take-up bar 20 is rotatably coupled to front side rail connector 16 by a pair of parallel ratchet support bars 24, one end being permanently connected to front side rail connector 16 adjacent side rails 11. The other ends of bars 24 include a cylindrical sleeve 49 for rotationally receiving and supporting cable take-up bar 20.

Drive means for turning cable take-up bar 20 includes a ratchet wheel 21 rotationally coupled along its axis to the axis of cable take-up bar 20. Wheel 21 has inclined teeth along its periphery for engaging a pawl 23, which is spring biased toward wheel 21 and engages the teeth to permit only unidirectional rotation of wheel 21 unless pawl 23 is pulled away from wheel 21. A handle 22 is coupled to the central axis of wheel 21 through a ratchet drive 22' thereby permitting an operator to use short back-and-forth strokes to rotate wheel 21.

Figure 4:
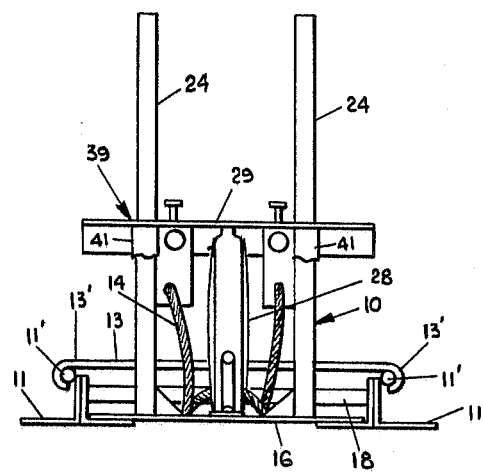
FIG. 4 is an end elevation view of a motor mount in accordance with another emdobiment of this invention.
Figure 5:
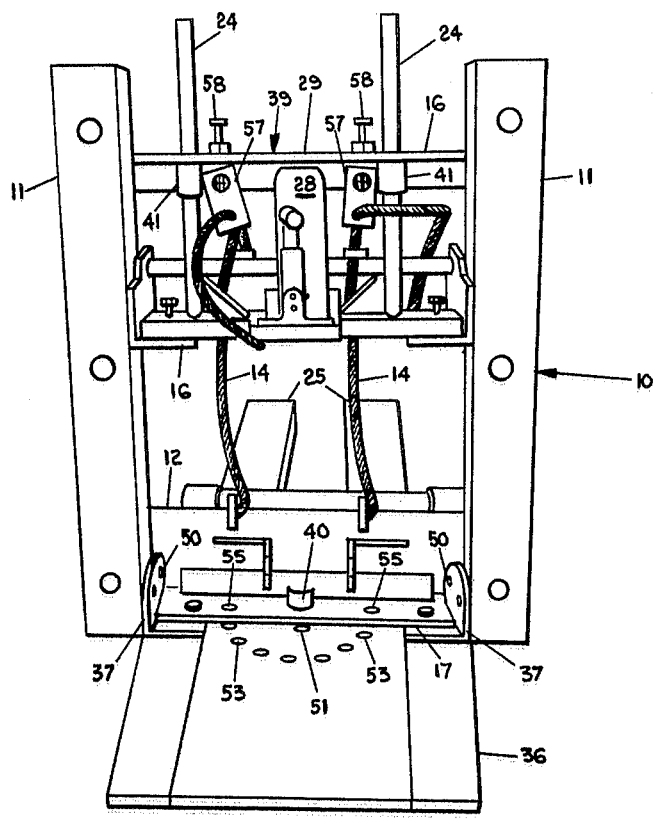
FIG. 5 is an end view of a tilted embodiment in accordance with this invention.

Referring to FIGS. 3 and 5, side rails 11 can be supported in a generally vertical position, instead of a generally horizontal position as shown in FIGS. 1, 2, and 4 by a tilt mounting support 37 having a pair of semicircular members coupled to the bottom or "rear" of side rails 11. Both side rails 11 and tilt mounting support 37 have apertures 50 which can be aligned to provide connection at various tilt angles. Such apertures in the semicircular member being arranged around the periphery and at the center for providing a pivot point.

If side rails 11 are in a generally vertical position, a pair of elongated extension supports 25 are coupled to crossbar support 12 so extension supports 25 extend outwardly generally horizontally. It is advantageous to have a horizontal support surface when mounting a motor because the motor is supported before it is firmly attached to motor 10 by the operator. Extension supports 25 have slotted ends which are engaged by openings 12 A and 12 B in back cross bar support 12, as shown in FIG. 2. As shown in FIGS. 3 and 5, the connection between front side rail connector 16 and side rails 11 is rotated so ratchet support bars 24 extend generally parallel to side rails 11, instead of being generally perpendicular. This is advantageous to move cable take-up means 39 out of the way of motor 38 when mounted on extension supports 25.

Motor mount 10 is rotationally oriented by a swivel mount assembly 36, shown in FIG. 5, including a flat horizontal plate with a central opening 51 for providing a pivot point and a plurality of openings 53 arranged in a circle around the central opening for providing a plurality of rotational positions. Rear side rail connector 17 has openings 55 which are aligned with the openings in swivel mount assembly 36 when motor mount 10 is in a desired rotational position, and which pass connection means such as bolts and nuts.

Another embodiment in accordance with this invention as shown in FIGS. 4 and 5, and includes a cable take-up means comprising an elongated jack connector bar 29 with securing blocks 57 for receiving tensioning cable 14 and a set screw extending into bar 29 for securing tensioning cable 14. Securing blocks 57 have an opening for receiving and securing tensioning cable 14 and are movably coupled to jack connector bar 29 by screws 58 which permit relatively fine tension adjustment of one tensioning cable 14 with respect to the other tensioning cable 14. Jack connector bar 29 extends horizontally between and slides along ratchet support bars 24 which extend through sleeves 41 (FIG. 5) mounted to bar 29. A force is applied to tensioning cable 14 by moving jack connector bar 29 in a direction away from guide bar 18. A jack is positioned between jack connector bar 29 and front side rail connector 16 for applying pressure to and moving jack connector bar 29. Jack 28 in the preferred embodiment is a hydraulically actuated unit well known in the art. Cross bar supports 12 and 13 can be moved in a direction away from jack 29 by release cable 15 and return lever 26 as in FIG. 1.

OPERATION

Motor mount 10 is particularly suited for mounting a motor in a plurality of positions and then quickly and easily moving the mount to tension the power transmission drive belt coupled to the motor. Depending on the motor and the location in which it is to be mounted, side rails 11 are in a horizontal position, a vertical position or a plurality of intermediate positions. Adjustment of the vertical orientation of side rails 11 is made by coupling side rails 11 to tilt mounting 37 at the desired vertical angle. If side rails 11 are substantially horizontal the motor is mounted on cross bar supports 12 and 13. On the other hand, if side rails 11 are substantially vertical, extension supports 25 are connected to back cross bar 12 to provide a substantially horizontal support for the connection of the motor.

The vertical clearance required by the motor may require that cable take-up means 39 be rotated out of the way to permit mounting of the motor. Since front side rail connector 16 is adjustably mounted to side rails 11, it can be positioned at a plurality of angles thereby rotating cable take-up means 39.

After a motor is secured to either extension supports 25 or cross bar supports 12 and 13, a power transmission drive belt is coupled to the motor around a pulley on the motor shaft. Handle 22 is turned so tensioning cable 14 is wound on cable take-up bar 20 and the desired amount of tension is applied to the power transmission drive belt. If cable take-up means 39 includes a hydraulic jack, force is applied to tensioning cable 14 by actuating jack 28 to drive connector bar 29.

To remove the drive belt from the motor, cross bar supports 12 and 13 must be moved in a direction opposite to that required for tensioning. If release cable 15 is connected to cable take-up bar 20, pawl 23 can be spaced from wheel 21 and wheel 21 turned to unwind tensioning cable 14 and wind up release cable 15. On the other hand, if release cable 15 is not coupled to cable take-up bar 20 or if a hydraulic jack embodiment is used, tensioning cable 14 is slacked and force is applied to release cable 15 by return lever 26 thereby moving the motor.

Various modifications and variations will no doubt occur to those skilled in the various arts to which this invention pertains. For example, the particular method of coupling the cables to the cable take-up means may be varied from that disclosed herein. Additionally, the connection means between the various elements of the motor mount may be varied from that disclosed herein. These and all variations which basically rely on the teachings through which this disclosure has advanced the art are properly considered within the scope of this invention as defined by the appended claims.

The embodiments of the invention in which an exclusive property or privilege is claimed are defined as follows:

1. A motor mount comprising:
   a base including a pair of elongated side rails and a side rail connector coupled to each of said side rails and supporting said side rails in a spaced, generally parallel relationship;
   a motor support means movably positioned on said side rails of said base for supporting and securing a motor;
   a cable means coupled to said motor support means for transmitting a force to said motor support means thereby acting to move said motor support means and tighten a power transmission belt associated with the motor;
   a cable take-up means coupled to said base and to said cable means for applying a force to said cable means and causing movement of the cable means;
   said motor support means including a cross bar support slidably mounted on said side rails for movement along said side rails and for receiving a motor and coupling means included in said cross bar support for connecting said cable means to said cross bar support; and
   said cable means including a tensioning cable coupled to said cross bar support and to said cable take-up means for applying a force in a first direction to said cross bar support and means for releasing the tension on said cable,
   said means for releasing the tension on said cable including a release cable coupled to said cross bar support for applying a force in a second direction, opposite from said first direction, to said cross bar support,
   and means coupled to said release cable, independent of said tensioning cable take-up means, for tensioning said release cable to apply said force in said second direction.

2. A motor mount as recited in claim 1 wherein said cable take-up means includes:
   an elongated cable take-up bar for rotating about itself said tensioning cable;
   a wheel axially coupled to said cable take-up bar having inclined teeth extending from its periphery;
   a pawl positioned to engage said inclined teeth and spring biased against said inclined teeth for causing unidirectional rotation of said wheel;
   a wheel handle connected to said wheel for turning said wheel;
   a ratchet-support bar coupled between said cable take-up bar and said side rail connector for supporting said cable take-up bar in spaced relationship from said side rail connector; and
   a cable guide bar coupled between said side rails for changing the direction of said tensioning cable between said cross bar support and said cable take-up bar.

3. A motor mount as recited in claim 2 further comprising:
   a tilt mounting coupled to an extremity of said side rails for orienting said side rails in a plurality of positions in the vertical plane, said tilt mounting having a pair of generally semi-circular end plates positioned for coupling with said side rails, each of said end plates having a plurality of openings around the periphery of said end plates and a central opening about which said side rails can pivot.

4. A motor mount as recited in claim 3 further comprising:
   a swivel mount assembly coupled to said side rail connector for rotationally orienting said motor mount in a plurality of positions in the horizontal plane, said swivel mount assembly including a generally flat horizontal support plate having a plurality of openings in a generally circular arrangement and a central opening about which said side rail connector can pivot.

5. A motor mount as recited in claim 4 further comprising:
   an elongated extension support means coupled to said cross bar support at a substantially right angle for supporting the motor when said side rails are rotated from a horizontal position.

6. A motor mount as recited in claim 8 wherein said side rail connector and side rails have mounting openings which can be aligned in a plurality of positions so said cable take-up means can be rotated with respect to said side rails to clear a motor mounted on said extension support means.

7. A motor mount as recited in claim 6 wherein said cable take-up means includes a connection to said release cable for rotating about said cable take-up bar said release cable thereby applying a force in said second direction to said cross bar support, and further includes:
   an elongated release cable guide bar coupled between said side rails for changing the direction of said release cable between said cross bar support and said cable take-up means.

8. A motor mount as recited in claim 6 further comprising:
   an elongated return lever coupled to said release cable between the extremities of said return lever and one extremity of said return lever adapted to engage said side rail connector and act as a fulcrum point of a force applied to said return lever.

9. A motor mount as recited in claim 1 wherein said cable take-up means includes:
   a jack connector bar coupled to said tensioning cable for applying a force to said cross bar support;

a ratchet support bar slidably engaging said jack connector bar and coupled to side rail connector;

a jack coupled to said side rail connector and positioned between said side rail connector and said jack connector bar for applying a force to said jack connector bar and causing movement of said jack connector bar along said ratchet support bar; and a cable guide bar coupled between said side rails for changing the direction of said cable between said cross bar support and said jack connector bar.

10. A motor mount as recited in claim 9 further comprising:

a tilt mounting coupled to an extremity of said side rails for orienting said side rails in a plurality of positions in the vertical plane, said tilt mounting having a pair of generally semi-circular end plates positioned for coupling with said side rails, each of said end plates having a plurality of openings around the periphery of said end plates and a central opening about which said side rails can pivot.

11. A motor mount as recited in claim 10 further comprising:

a swivel mount assembly coupled to said side rail connector for rotationally orienting said motor mount in a plurality of positions in the horizontal plane, said swivel mount assembly including a generally flat horizontal support plate having a plurality of openings in a generally circular arrangement and a central opening about which said side rail connector can pivot.

12. A motor mount as recited in claim 11 further comprising:

an elongated extension support means coupled to said cross bar support at a substantially right angle for supporting the motor when said side rails are rotated from a horizontal position.

13. A motor mount as recited in claim 12 wherein said side rail connector and said side rails have mounting openings which can be aligned in a plurality of positions so said cable take-up means can be rotated with respect to said said rails to clear a motor mounted on said extension support means.

14. A motor mount as recited in claim 13 further comprising:

an elongated return lever coupled to said release cable between the extremities of said return lever and one extremity of said return lever adapted to engage said side rail connector and act as a fulcrum point of a force applied to said return lever.

15. A motor mount comprising:

a pair of elongated side rails having a plurality of mounting openings;

a front side rail connector coupled to each of said side rails and supporting said side rails in a spaced, generally parallel relationship, said front side rail connector having a plurality of mounting openings for aligning in a plurality of positions with said mounting openings of said side rails so said side rail connector can be rotated with respect to said side rails;

a rear side rail connector coupled to each of said side rails and supporting said side rails in a spaced, generally parallel relationship, said rear side rail connector including a tilt mounted coupled to an extremity of said side rails for orienting said side rails in a plurality of positions in the vertical plane, said tilt mounting having a pair of generally semi-circular end plates positioned for coupling with said side rails, each of said end plates having a plurality of openings around the periphery of said end plates and a central opening about which said side rails can pivot;

a front and a rear cross bar support slidably mounted on said side rails for moving along said side rails and coupling to a motor;

a tensioning cable coupled to said front cross bar support for applying a force in a first direction to said cross bar support;

a release cable coupled to said rear cross bar support for applying a force in a second direction opposite from said first direction, to said rear cross bar support;

a pair of parallel ratchet support bars, each ratchet support bar coupled to an extremity of said front side rail connector;

a cable take-up means coupled to said tensioning cable for applying a force to and causing movement of said tensioning cable, said cable take-up means mounted on said front side rail connector and coupled to said ratchet support bars; and a front cable guide bar coupled between said side rails for changing the direction of travel of said tensioning cable between said front cross bar support and said cable take-up means.

16. A motor mount as recited in claim 15 wherein said cable take-up means includes:

an elongated cable take-up bar rotationally coupled to said pair of ratchet support bars;

a wheel axially coupled to said cable take-up bar having inclined teeth extending from its periphery;

a pawl mounted on one of said ratchet support bars and positioned to engage said inclined teeth and spring biased against said inclined teeth for causing unidirectional rotation of said wheel; and a wheel handle connected to said wheel for turning said wheel.

17. A motor mount as recited in claim 16 wherein said release cable is coupled to said cable take-up bar so said release cable can be wound on said cable take-up bar as said tensioning cable is unwound from said cable take-up bar, and further comprising:

an elongated release guide bar coupled between said rails for changing the direction of said release cable between said rear cross bar support and said cable take-up means.

18. A motor mount as recited in claim 15 wherein said cable take-up means includes:

an elongated jack connector bar slidably engaging said pair of parallel ratchet support bars and coupled to said tensioning cable for applying a force on said front cross bar support;

a jack coupled to said front side rail connector and positioned between said side rail connector and said jack connector bar for applying a force to said jack connector bar and causing movement of said jack connector bar along said ratchet support bar; and an elongated return lever coupled to said release cable between the extremities of said return lever and one extremity of said return lever adapted to engage said rear side rail connector and act as a fulcrum point of a force applied to said return lever.

* * * * *

UNITED STATES PATENT AND TRADEMARK OFFICE
CERTIFICATE OF CORRECTION

PATENT NO. : 4,098,477
DATED : July 4, 1978
INVENTOR(S) : Juan Perez

It is certified that error appears in the above-identified patent and that said Letters Patent are hereby corrected as shown below:

Column 2; line 4:
   "emdobiment" should be --embodiment--

Column 3; line 65:
   "motor 10" should be --motor mount 10--

Column 4; line 32:
   "jack is" should be --jack 28 is--

Column 5; line 3:
   "drive connector" should be --drive up jack connector--

Column 6; line 43:
   "8" should be --5--

Column 7; line 41:
   "said said" should be --said side--

Signed and Sealed this

Sixth Day of March 1979

[SEAL]

Attest:

RUTH C. MASON
Attesting Officer

DONALD W. BANNER
Commissioner of Patents and Trademarks